J. H. CAMPBELL.
FRONT WHEEL BRAKE FOR VEHICLES.
APPLICATION FILED DEC. 12, 1911.
1,073,590.
Patented Sept. 23, 1913.
2 SHEETS—SHEET 2.
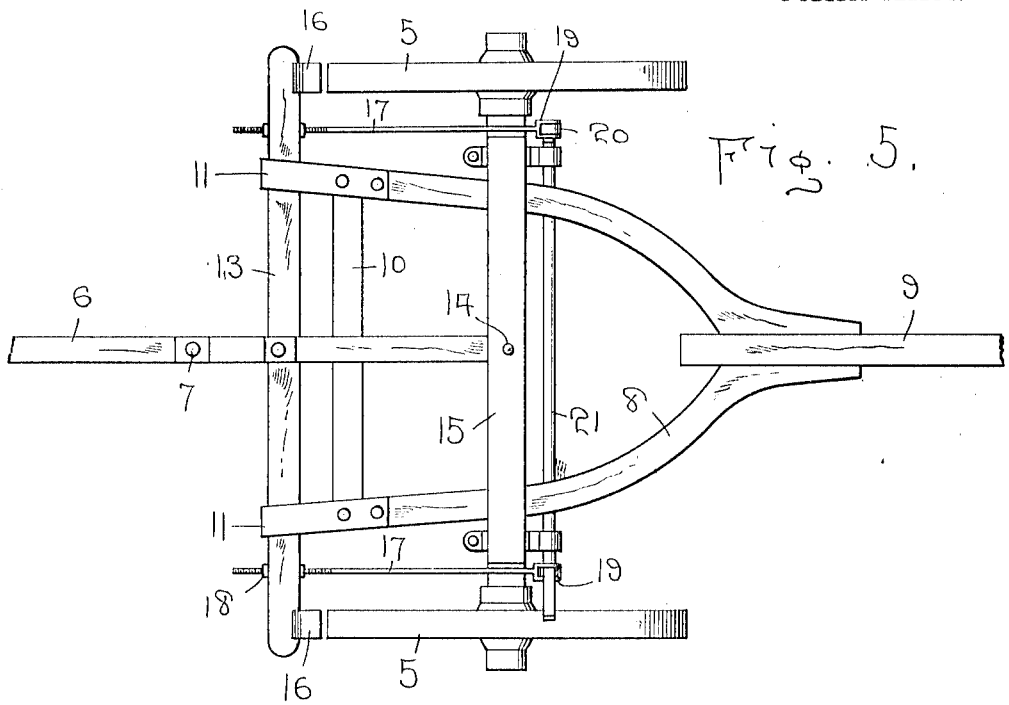
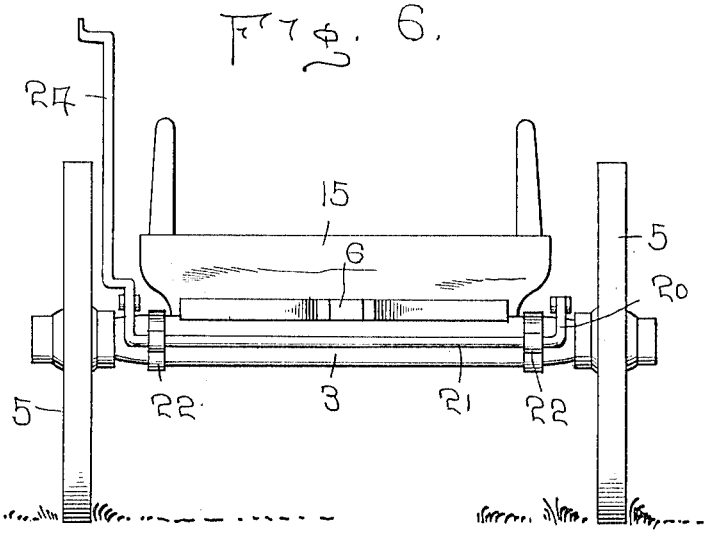

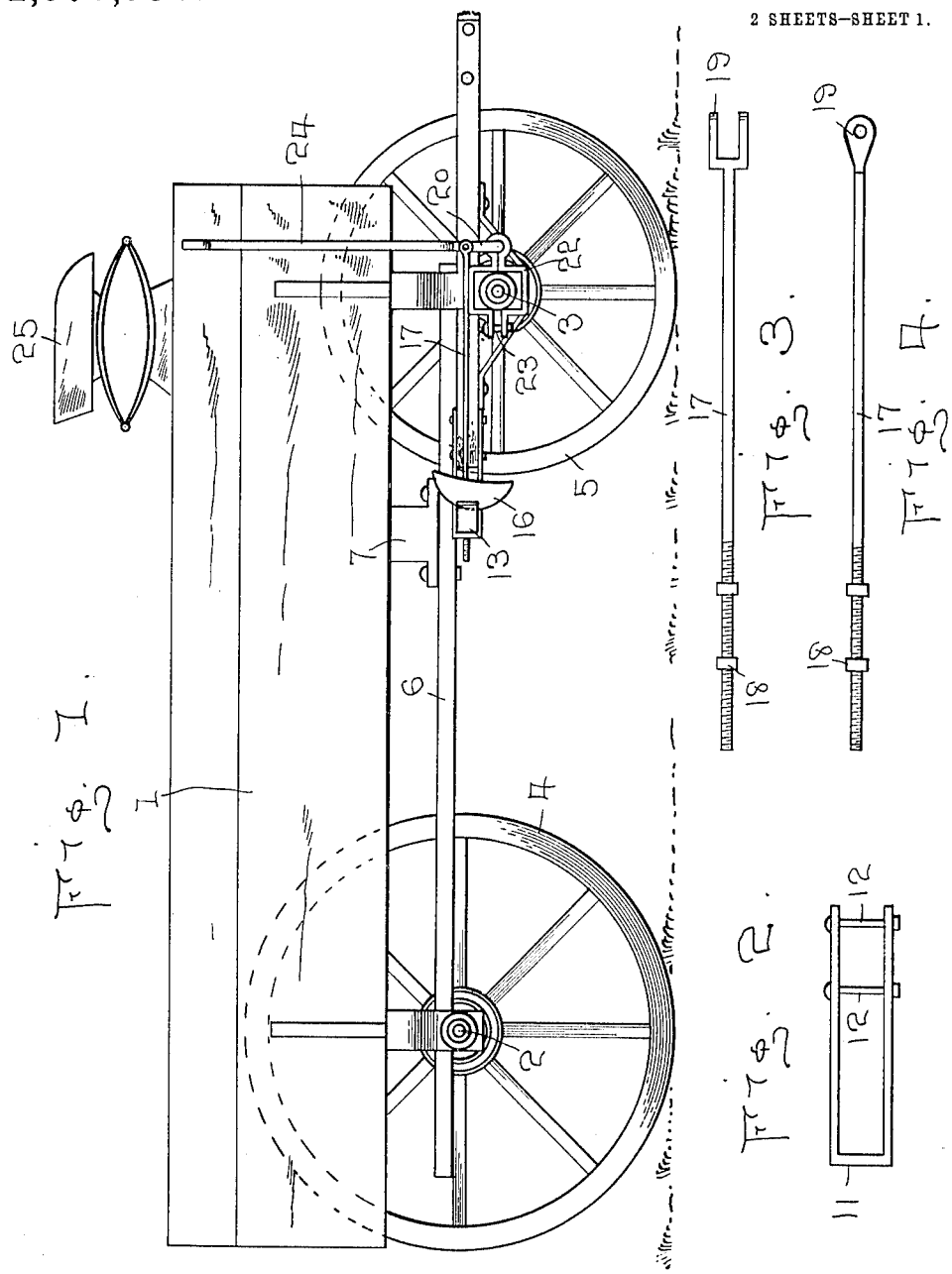

UNITED STATES PATENT OFFICE.

JONAH H. CAMPBELL, OF HOLLIS, OKLAHOMA.

FRONT-WHEEL BRAKE FOR VEHICLES.

1,073,590. Specification of Letters Patent. Patented Sept. 23, 1913.

Application filed December 12, 1911. Serial No. 665,216.

*To all whom it may concern:*

Be it known that I, JONAH H. CAMPBELL, a citizen of the United States, residing at Hollis, in the county of Harmon and State of Oklahoma, have invented certain new and useful Improvements in Front-Wheel Brakes for Vehicles; and I do hereby declare the following to be a full, clear, and exact description of the invention, such as will enable others skilled in the art to which it appertains to make and use the same.

This invention relates to brakes and more particularly to front wheel brakes for vehicles.

An object of the invention is to provide a brake which may be readily applied to the front wheels of a wagon or other vehicle from a position rearwardly of said wheels.

Another object is to provide a brake of this character which may be controlled from the driver's seat.

A further object is to generally improve the construction and operation of the front wheel brake.

Other objects and advantages will be hereinafter set forth and pointed out in the specification and claim.

In the accompanying drawings which are made a part of this application, Figure 1, is a side view of a wagon with my improved brake applied thereto, two of the wheels being removed to more clearly show parts of the brake. Fig. 2, is an enlarged detail view of one of the brake beam holding yokes. Fig. 3, is a plan view of one of the connecting rods. Fig. 4, is a side view of the same. Fig. 5, is a plan view of the front running gear and brake mechanism, and, Fig. 6, is a front view of the same.

Referring more particularly to the drawings in which similar reference numerals designate corresponding parts throughout the several views, 1 represents the wagon body, and 2 and 3 the rear and front axles, carrying the rear wheels 4 and the front wheels 5, respectively.

The rear and front axles 2 and 3, respectively, may be connected by the usual reach pole 6, upon the upper face of which is carried the movement limiting block 7 adapted for engagement against the under side of the bottom of the wagon body 1, as will be later more fully described.

Secured upon the front axle 3 are the hounds 8 between the forward ends of which is secured the tongue 9. The rear ends of the hounds 8 are connected by the connecting bar 10 which serves to brace said hounds at their rear ends. The hounds 8 also have secured to their rear ends the parallel ends of the beam holding yokes 11, by means of suitable bolts 12 or other securing means. The yokes 11 project rearwardly of the rear ends of the hounds 8 and positioned through said yokes is the brake beam 13 which projects to either side of the yokes 11 to a distance slightly beyond the periphery of the front wheels 5.

The front end of the reach pole 6 is preferably pivoted, by means of the king bolt 14, between the front axle 3 and the bolster 15 and works over the connecting bar 10 and brake beam 13. The brake beam 13 carries the brake shoes 16 near its opposite ends for engagement with the periphery of the front wheels 5 at a point slightly above the plane of the axle 3 and hubs of the wheels 5.

At suitable points between the brake shoes 16 and the yokes 11, the threaded ends of the connecting rods 17 are passed horizontally through the brake beam 13 and the nuts 18 screwed up against the opposite sides of said beam to hold the rods 17 against independent movement. The forward ends of the rods 17 are forked and perforated, as shown at 19, for engagement upon opposite sides of the similarly perforated off-sets or arms 20 of the rock shaft 21, said forked ends being locked with the arms 20 by rivets or other suitable fastening means passed through the perforations of said forked ends and arms.

The rock shaft 21 is positioned forwardly of the front axle 3 and slightly below the hounds 8 and may be secured to said axle in any preferred manner such as by means of the clamps 22 which have their central portions engaged around the shaft and their opposite ends drawn together by means of the bolts 23, said clamps being bent between their ends and their central portions, for engagement around the axle 3, as clearly shown in Fig. 1. One arm 20 of the rock shaft 21 is continued upwardly to form the brake controlling lever 24 adapted for engagement between the wagon body 1 and the front wheel 5, the upper end of the lever assuming a position adjacent the driver's seat 25.

When it is desired to apply the brake shoes 16 to the wheels 5, the lever 24 is thrown forwardly, swinging the rock shaft 21 within the clamps 22 and drawing the connecting rod 17 forwardly. This draws the brake beam 13 in a forward direction, forcing the shoes 16 against the periphery of the front wheels 5. As the wheels 5 are rotated in a forward direction, an upward strain will be directed against the shoes 16, causing the latter to tighten upon the wheels and preventing the same from carrying mud or the like upon their periphery, said shoes scraping the mud from the wheels. The brake beam 13 being in the same plane as the bar 10 will press upon the under side of the reach pole 6 and will be thus held against upward displacement. By arranging the brake beam 13 and bar 10 in the manner shown, the tongue 9 is much more firmly held in horizontal position. The brake beam 13 will press upwardly upon the reach pole 6 and cause the forward end of the same to rise until the movement limiting block 7 strikes the bottom of the wagon bed 1, thus limiting the upward movement of said parts.

It will be evident that this brake will at all times be under control of the driver and will be highly efficient and effective, especially when the vehicle is descending a steep incline. It will also be apparent that this form of brake may be employed upon wagons, of the type now in use, without altering the construction of the same. Further, should any of the parts become worn or broken they may be readily replaced at a small cost without removing the remainder of the mechanism.

What I claim is:

In a wagon brake the combination with the running gear, of a brake beam positioned rearwardly of the front hounds and adapted to bear against the under side of the reach pole, shoes carried by said beam adapted for engagement with the periphery of the front wheels above the axis thereof, whereby an upward strain would be exerted against said beam and reach pole, means for operating said brake beam, and a block secured to the upper side of said reach pole and adapted for engagement with the wagon body, to limit the upward movement of said pole caused by the strain on said beam.

In testimony whereof I have signed my name to this specification in the presence of two subscribing witnesses.

JONAH H. CAMPBELL.

Witnesses:
J. E. HOLLIS,
W. L. PROCK.